June 22, 1971     E. SOLBECK     3,586,588
APPARATUS FOR THE MANUFACTURING OF LAMINATED MATERIAL
Filed Nov. 4, 1968     4 Sheets-Sheet 1
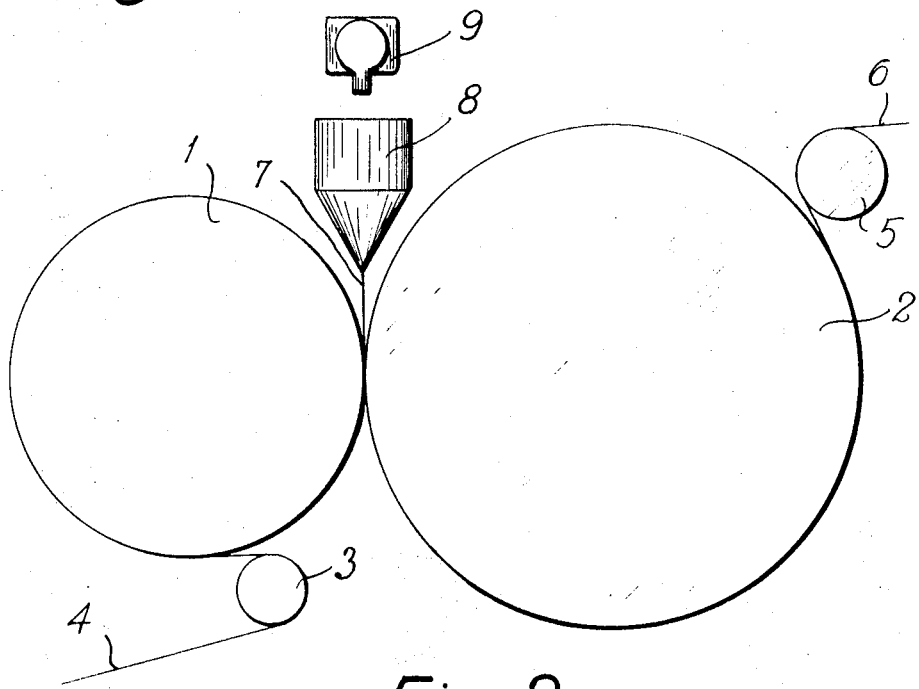
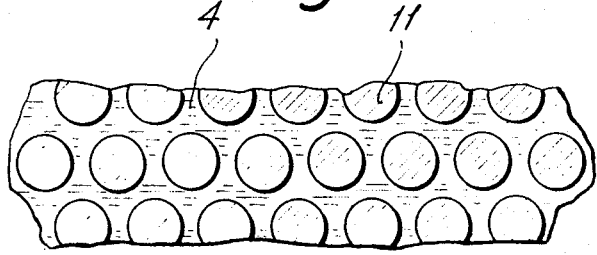
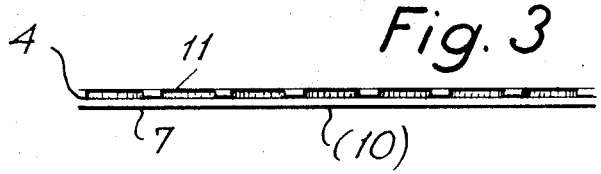
INVENTOR
ERIK SOLBECK
BY
*Kenyon & Kenyon*
ATTORNEYS

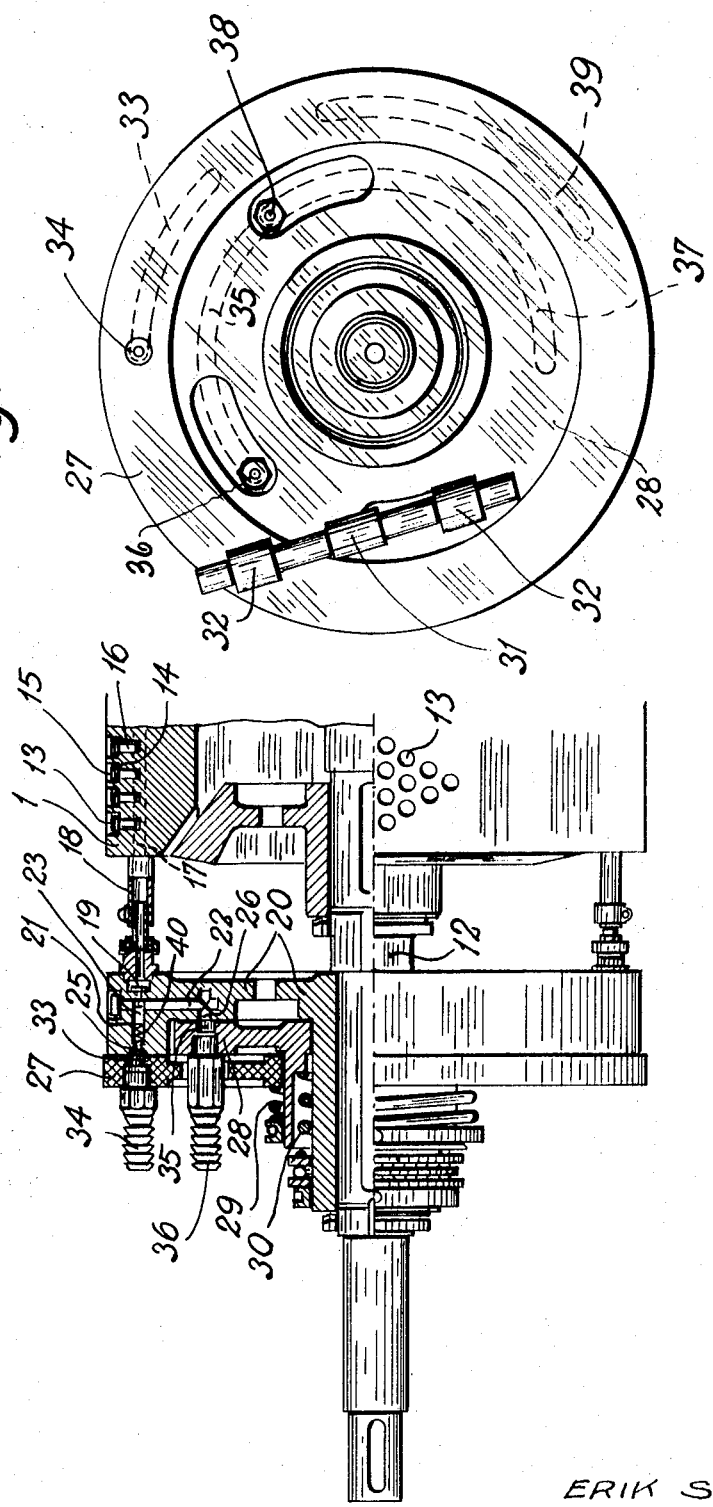

June 22, 1971  E. SOLBECK  3,586,588

APPARATUS FOR THE MANUFACTURING OF LAMINATED MATERIAL

Filed Nov. 4, 1968  4 Sheets-Sheet 4

INVENTOR.
ERIK SOLBECK
BY
ATTORNEYS

United States Patent Office 3,586,588
Patented June 22, 1971

3,586,588
APPARATUS FOR THE MANUFACTURING OF
LAMINATED MATERIAL
Erik Solbeck, 342 Vedbaek Strandvej,
2950 Vedbaek, Denmark
Filed Nov. 4, 1968, Ser. No. 773,064
Claims priority, application Denmark, Nov. 2, 1967,
5,454/67
Int. Cl. B32b 31/06; B65h 17/30
U.S. Cl. 156—553                                    6 Claims

ABSTRACT OF THE DISCLOSURE

A disc slide is mounted coaxially of the embossing roller and is composed of a disc and a cover. The disc is provided with nipples in connection with vacuum channels in the embossing roller while the cover is provided with channels and apertures to connect a vacuum source with the nipples. The cover includes two mutually rotatable discs which contain check valves which prevent loss of the vacuum upon bursting of a depression in the foil.

---

The present invention concerns an apparatus for manufacturing laminated materials consisting of sheets or foils sealed together whereby at least one of the outerlayers consists of a thermoplastic foil, presenting before the sealing a number of depressions placed side by side covering the whole surface of the foil and all being open to that side of the foil, which shall be sealed to the other components of the laminated material, whereby each depression forms a closed, air-filled cell. Such laminated materials are used for many purposes for instance as shock-absorbing packaging materials or paddings.

The present apparatus is of the art known in manufacturing such cellular laminated materials making use of rollers pressed against each other and provided with means for heating and cooling the foil material passed between them for sealing, whereby the rollers on which the cell forming depressions are to be formed, are embossing rollers presenting a number of cavities corresponding in form and distribution over the surface to the desired depressions and standing in connection with valve-controlled channels connected to a source of vacuum.

It is an object of the present invention to provide an apparatus of this kind having new and reliable means of control for the distribution of vacuum to the cavities of the embossing rollers, hereby allowing the apparatus to work with great speed, without danger of repeated interruptions caused by faults in the manufacturing of the material on the rollers.

With this object in view the controlling means placed between the cavities in the embossing roller and the source of vacuum according to the invention consist of a disc-slide fastened coaxially of the roller shaft, and composed first by a disc provided with nipples in connection with channels formed in the roller and leading to the cavities thereon, second by a discover connected with the stationary vacuum source and provided with channels and openings leading to the said nipples.

The invention also has the object to provide an apparatus as stated, having means for preventing stoppage during the working caused thereby, that a great amount of surrounding air streams to the vacuum source in case one or some of the depressions in the thermoplastic foil should burst open when sucked into the cavity of the embossing roller during the formation of the cellular laminated material. According to the invention, such stoppages are prevented by providing check valves in the channels in the disc slide. In order that the invention may be fully understood, it will be described in detail by way of example and with reference to the accompanying drawing, in which:

FIGS. 1a and 1b are diagrammatic side elevations illustrating embodiments of an apparatus for manufacturing laminated materials;

FIG. 2 is a plan view of a sample of such laminated material;

FIG. 3 is a sectional view in said material;

FIG. 4 is an enlarged sectional view of an embossing roller according to the invention;

FIG. 5 is a left hand view of the same; and

Figure 1B:
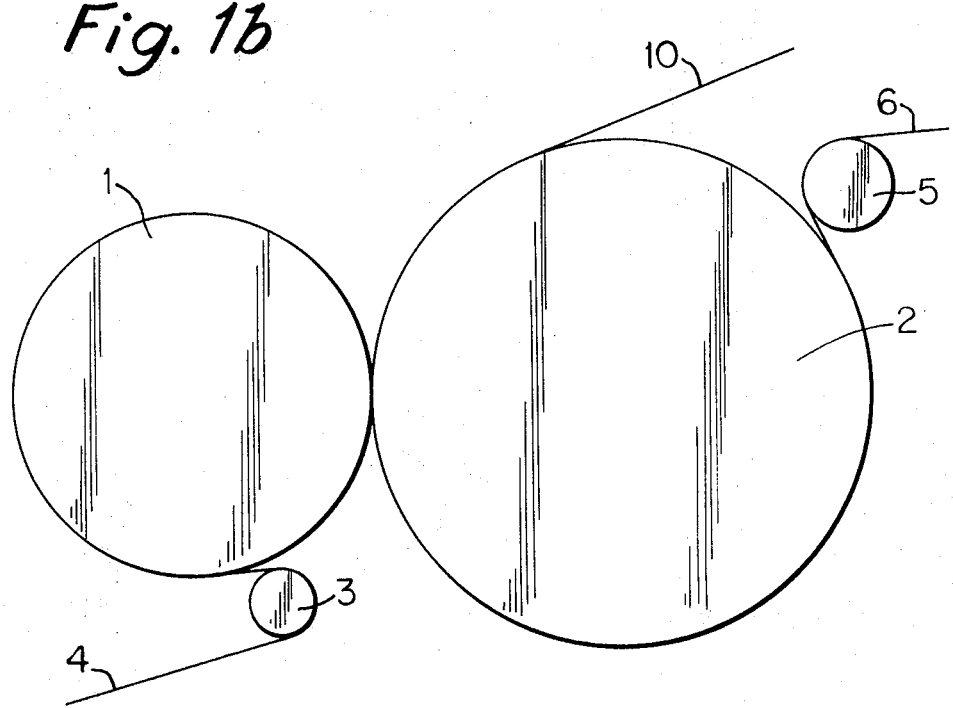

As indicated diagrammatically on FIG. 1, the apparatus generally consists of two rollers 1 and 2 mounted in a manner known in the art on shafts in a frame (not shown) and provided with means for heating and cooling the surface in such a manner, that the roller 1 is kept heated and the roller 2 cooled. The apparatus further comprises a guide roller 3 for a web 4 of one of the foils of which the laminated material shall consist, and a guide roller 5 for the finished product 6.

In the example shown in FIG. 1a, the other web 7, consisting of thermoplastic material and which shall be sealed together with the web 4 is extruded directly from a nozzle 8 pertaining to an extruder 9.

As indicated in FIG. 1b, a web 10 can be used instead of or together with the web 7.

As described further in detail in the following, the roller 1 is provided with cavities in the cylindrical surface thereof. These cavities stand as well known in the art in connection with a vacuum source. Hereby the thermoplastic web 4 during the passage over the roller 1 is formed as to present depressions 11. During the passage through the throat between the rollers 1 and 2 the webs are sealed together, whereafter the finished product is formed as shown in FIGS. 2 and 3.

The roller 1 is, as shown in FIGS. 4 and 5, fastened on a shaft 12 mounted in a frame (not shown). In the cylindrical surface of the roller, cavities 13 are found. These cavities have on the innerside a seat 14 against which a loose bottomplate 15 in each cavity rests. The diameter of these bottom plates is somewhat smaller than the inner diameter of the cavity. In the embodiment shown on the drawing each of the bottom plates 15 for steering has a pin 16 reaching downwards into the lower part of the cavity. These pins have triangular sections. In this way narrow passages for the air is established along the outer periphery of the bottom plates 15 and along the pins 16. In the wall of the roller 1 a number of axially disposed channels 17 are found. Each channel communicates with the bottom part of one or two rows of cavities disposed in axial direction on the cylindrical surface of the roller. A vacuum, acting in one of said channels 17, therefore will provoke a suction to take place in all the cavities connected therewith, whereby the air in the cavity will be sucked away past the bottom plates 15 and pins 16. Therefore, the strongest suction will occur along the circumference of the bottom plates 15, causing the thermoplastic foil which hereby is sucked inwards into the cavities, to assume the form of flat cylindrical depressions as shown in FIGS. 2 and 3.

The channels 17 are connected with nipples 18 on the one end of the roller. These nipples are again connected with apertures 19 on the one side of discslide 20 fastened on the shaft 12. Each of the apertures 19 is connected to a valve chamber 21 and to a channel 22. In the valve chamber 21 is placed a valve member 24 with a stem member 23, actuated by a spring 40 biasing the valve 24 to open position. The chamber behind the valve 24 is connected to an aperture 25 on the other side of the disc slide 20 from the apertures 19, whereas the channels 22 are connected to apertures 26 on the same side of the disc slide as the apertures 25.

The apertures 25 and 26 work together with a cover 27, 28, which in the form shown on the drawing is built up to two discs 27 and 28 which can be slightly rotated in relation to each other for regulation purposes as will be explained in the following. This cover is rotatably mounted on the shaft 12 but is held in stationary relation to the not shown frame in which the shaft 12 is mounted. The disc 27 covers the apertures 25. The two discs are held pressed against the disc slide 20 by springs 29 and 30, which are mounted on the shaft 12. The two discs 27 and 28 are interconnected by a screw 31 having right and lefthanded threads screwed into knobs 32, in such a way, that turning the crew 31 results in altering the angular position of the two discs in relation to each other. In all other respects, the two discs act as one single cover 27, 28 for the disc slide 20.

On the outside of the apertures 25 the disc 27 has a channel 33 in the form of a circular arc. This channel is connected to a nipple 34 on the disc 27. On the outside of the apertures 26 the disc 28 has a similar channel 35 connected to a nipple 36. The two nipples 34 and 36 are by means not shown connected to a vacuum source.

In the disc 28 further is found a channel 37 corresponding to the channel 35 open to the surrounding atmosphere or to a source for pressure air through a nipple 38, shown only in FIG. 5.

The operation of the apparatus is as follows:

The roller 1 and the disc slide 20 is rotated continuously, whereas the cover 27, 28 is standing still. Each of the apertures 25 and 26 therefore will pass the channels 33 and 35 once during each revolution of the roller. The cover is placed in such positions, that suction through the channels 33 and 35 will act in those channels 17, which during the movement are connected herewith in a sufficient long time to allow the warm plastic foil on the roller 1 to be sucked into the cavities 13 and to assume the form shown in FIGS. 2 and 3. The roller 1 is hereby held at such a temperature, depending on the nature of the web used, that the material is in a plastic condition so as to first allow formation to take place and thereafter to allow the subsequent sealing together of the webs used.

Figure 6:
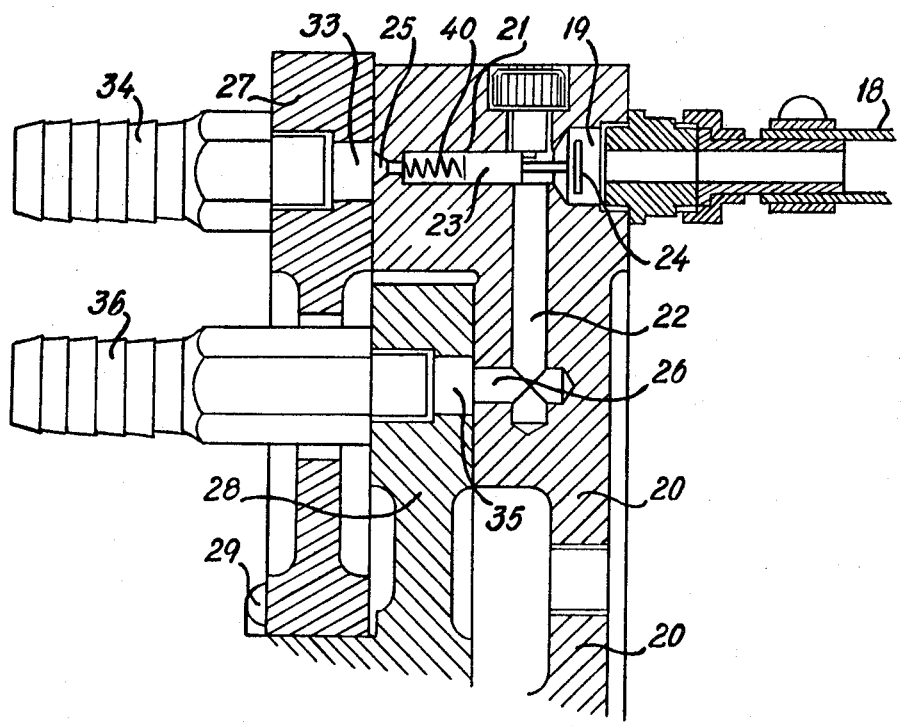
FIG. 6 is a view of a controlling means of the invention corresponding in part to FIG. 4.

During rotation of the roller 1 and the suction head 20 (assuming normal operation without any burst of a depression in the thermoplastic sheet) each valve member 24 will continuously be in the open position as shown in FIG. 6 biased by the spring 40. As one of the ports 26 moving clockwise in FIG. 5 approaches the channel 35, atmospheric pressure will prevail in the corresponding cavities 13 and on the valve and stem members 24 and 23. When a port 26 is connected to channel 35, vacuum from the vacuum source connected to nipple 36 causes suction to be applied in the corresponding cavities 13 through channel 22 and port 19 since valve 24 is open. When now port 25 is connected to the channel 33 at a later moment, the vacuum from nipple 34 will act on the left hand end of stem member 23 tending to close valve 24. As long as the same vacuum prevails in valve chamber 21 and port 19, the valve will, however, remain open due to the force of spring 40. The suction in cavities 13 will therefore normally be maintained until port 26 reaches channel 37 open to the atmosphere or alternatively to a source of pressurized air which may be used to blow the cells or depressions formed in the roller cavities free of the roller 1. In this connection, it should be noted that the air-tight relation between the opposed surfaces of suction head 20 and valve disc 27 as well as between stem member 23 and vacuum chamber 21 is only "substantially" air-tight, no particular sealing means being provided so that except for the periods in which a port 25 is connected to channel 33, the pressure in chamber 21 will be approximately the same as in port 19 or at a value between that pressure and atmospheric pressure. Consequently, as mentioned above, valve 24 will remain open during normal operation of the apparatus.

When, however, one or more of the depressions formed in the sheet by suction in the cavities should burst, allowing the surrounding atmosphere to enter the corresponding channel 17 while vacuum is prevailing in chamber 21, the pressure difference acting on valve 24 and stem 23 will cause the valve to close like a check valve preventing the destruction of the vacuum which may necessitate stopping the apparatus.

As shown with dotted lines in FIG. 5, an extra channel 39 can be foreseen in the discslide for securing the introduction of atmospheric or pressure air.

What is claimed is:

1. Apparatus for forming depressions in a heated sheet of thermoplastic material comprising
    a rotary roller having cavities in the surface thereof and axially extending channels each connected to a plurality of said cavities;
    means for rotating said roller;
    means for advancing the heated sheet in contact with said roller surface;
    a valve device comprising a disc-shaped suction head connected to said roller for rotation therewith and a stationary valve disc, said valve disc having one face located in substantially airtight relationship with one axial face of said suction head, arcuate channels of different radii in the surface thereof abutting against said one axial face of said suction head and means for connecting each arcuate channel to a vacuum source;
    a plurality of port groups each of which includes a first port and a second port in said face of said suction head and a third port in the opposite face of said suction head aligned with said second port of the group, each of said first and second ports being radially aligned with a respective one of said arcuate channels in said valve disc;
    means connecting each third port with an associated one of said channels in said roller;
    a valve chamber connecting said second and third ports of each group;
    a non-return valve comprising a valve member located in each third port and integral with a stem member slidingly received in said valve chamber with a substantially airtight fit;
    a spring biasing said valve and stem members to open said third port; and
    a channel in said suction head connecting said first port with said associated valve chamber intermediate said valve and stem members.

2. Apparatus as claimed in claim 1 wherein said channel in said stationary valve disc aligned with said second port of each group has a shorter circumferential length than said channel aligned with said first port.

3. Apparatus as claimed in claim 1 wherein said stationary valve disc comprises two disc members which are angularly adjustable relative to one another and which each includes one of said arcuate channels.

4. Apparatus as claimed in claim 1 wherein said stationary valve disc is provided with a third arcuate channel on the same radius as said channel aligned with said first port of each port group and means for connecting said third channel to a source of pressurized air.

5. Apparatus as claimed in claim 4 wherein said stationary valve disc is provided with a fourth arcuate channel on the same radius as said channel aligned with said second port of each port group and means for connecting said fourth channel to the atmosphere.

6. Apparatus as claimed in claim 1 wherein each cavity in said roller surface has an internal annular seat and which further includes a radially movable bottom plate loosely engaged with said seat, said plate having dimensions slightly smaller than those of said cavity.

References Cited

UNITED STATES PATENTS

| | | | |
|---|---|---|---|
| 3,238,920 | 3/1966 | Fowlie et al. | 226—95X |
| 3,285,793 | 11/1966 | Chavannes | 156—292X |

BENJAMIN A. BORCHELT, Primary Examiner

J. M. HANLEY, Assistant Examiner

U.S. Cl. X.R.

156—285, 292; 226—95